Dec. 30, 1947.  C. W. WALZ ET AL  2,433,799
BEET HARVESTER WITH TOPPER AND TOP CONVEYOR
Filed May 3, 1943  6 Sheets-Sheet 1

FIG. 1

INVENTORS
CLAUDE W. WALZ, CLARENCE T.
RASMUSSEN & HOWARD F. CLAUSEN
BY
ATTORNEYS.

Dec. 30, 1947.  C. W. WALZ ET AL  2,433,799
BEET HARVESTER WITH TOPPER AND TOP CONVEYOR
Filed May 3, 1943  6 Sheets-Sheet 3

INVENTORS
CLAUDE W. WALZ, CLARENCE
T. RASMUSSEN & HOWARD F. CLAUSEN
BY
ATTORNEYS.

Dec. 30, 1947.  C. W. WALZ ET AL  2,433,799
BEET HARVESTER WITH TOPPER AND TOP CONVEYOR
Filed May 3, 1943  6 Sheets-Sheet 4

INVENTORS
CLAUDE W. WALZ, CLARENCE T.
RASMUSSEN & HOWARD F. CLAUSEN
BY
ATTORNEYS.

Dec. 30, 1947. C. W. WALZ ET AL 2,433,799
BEET HARVESTER WITH TOPPER AND TOP CONVEYOR
Filed May 3, 1943 6 Sheets-Sheet 6

INVENTORS
CLAUDE W. WALZ, CLARENCE T.
RASMUSSEN & HOWARD F. CLAUSEN
BY
ATTORNEYS

Patented Dec. 30, 1947

2,433,799

UNITED STATES PATENT OFFICE 2,433,799

BEET HARVESTER WITH TOPPER AND TOP CONVEYOR

Claude W. Walz, Avondale, Colo., and Clarence T. Rasmussen and Howard F. Clausen, Moline, Ill., assignors to Deere & Company, Moline, Ill., a corporation of Illinois Application May 3, 1943, Serial No. 485,527

45 Claims. (Cl. 55—9)

The present invention relates generally to agricultural implements and more particularly to machines for harvesting sugar beets and the like.

The object and general nature of the present invention is the provision of an improved sugar beet harvester having new and improved topping means for severing the tops from the beets and a new and improved means for handling the tops after they have been cut from the beets. More specifically, it is a feature of this invention to provide new and improved means for carrying the topping unit from a conventional farm tractor and a new and improved means for adjusting the position thereof and for transmitting forward draft thereto.

Another feature of the present invention is the provision of means whereby the knife that severs the tops of the beets while the latter are still in the ground is kept clear of leaves, streamers, tops, trash and the like while in operation, and a further feature of this invention is the provision of improved means for raising and lowering the topping knife according to the size of the beet approaching the knife. It is also a feature of this invention to provide mechanism whereby beet gauging means may move downwardly relative to the knife, thereby permitting the knife to pass straight through a beet even though during the passage of the knife through the beet the gauging means moves away therefrom.

Another important feature of the present invention is the provision of means mounting the topping unit on a conventional farm tractor of the tricycle type whereby the topping unit may be propelled down a row of beets while all wheels of the tractor operate in the spaces between the rows. The principal advantage of this arrangement is that it is unnecessary to open a field by other means before using the beet harvester, as formerly was necessary with machines in which one or more of the wheels were required to travel over a row.

Still further, a feature of this invention is the provision of means for receiving and conveying the severed tops laterally of the tractor, an additional feature being the provision of means for adjusting the top conveyor laterally of the tractor so that the tops from any one of several rows may be windrowed together, that is, the tops cut from any one of several rows may be deposited in one and the same row, thus facilitating subsequent loading of the tops for stacking or for removal from the field.

A further feature of this invention is the provision of improved reversing gear making it possible to reverse not only the shifting of the top conveyor but also the direction of movement of the top conveying means thereof. It is also a feature of this invention to provide new and improved mechanism for controlling the application of power to the top conveyor, both for shifting the same and for driving the conveying means thereof.

These and other objects and advantages of the present invention will be apparent to those skilled in the art after a consideration of the following detailed description, taken in conjunction with the accompanying drawings.

In the drawings:

Figure 10A is a view similar to Figure 10 but showing some of the parts in section, Figure 10A also showing a modified form of certain parts of the conveyor control;

Figure 1:
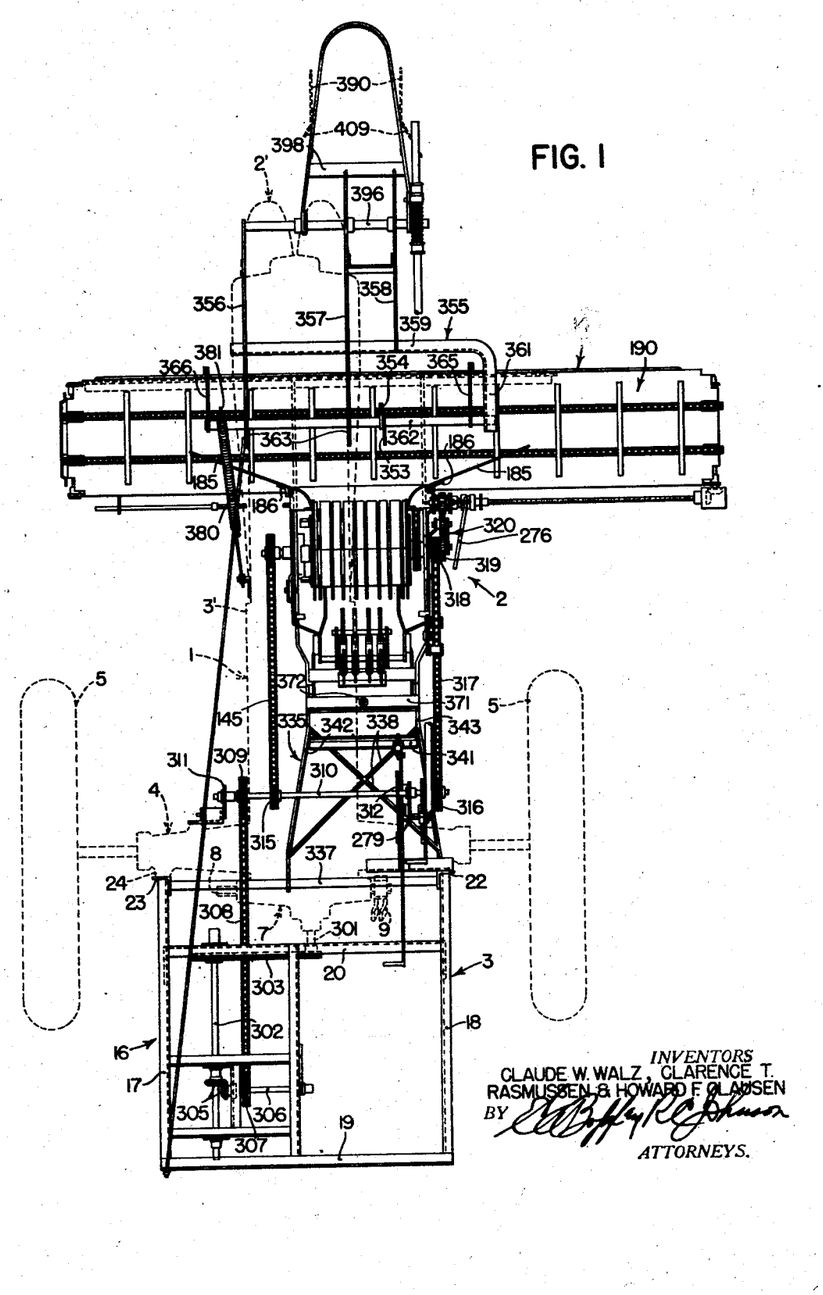
Figure 1 is a plan view of a beet harvester incorporating the principles of the present invention.

Referring now more particularly to Figure 1, the beet harvester in which the principles of the present invention have been incorporated comprises, in general, three units, namely, the tractor 1 of the conventional farm type, a topping unit 2 carried generally at the forward end of the tractor 1, and a rear beet-lifting and elevating unit 3. The present invention is not especially concerned with the particular details of the lifting and elevating unit 3, the same being shown and claimed in the co-pending application filed May 3, 1943, by Claude W. Walz, Clarence T. Rasmussen and Robert D. Griff, Serial No. 485,526, to which reference may be had if necessary. The present invention is more particularly concerned with the topping unit 2 and the manner in which it is supported on the tractor with especial reference to the relationship with the rearwardly disposed lifting and elevating unit 3, as will be clear from the following description.

Figures 2, 14:
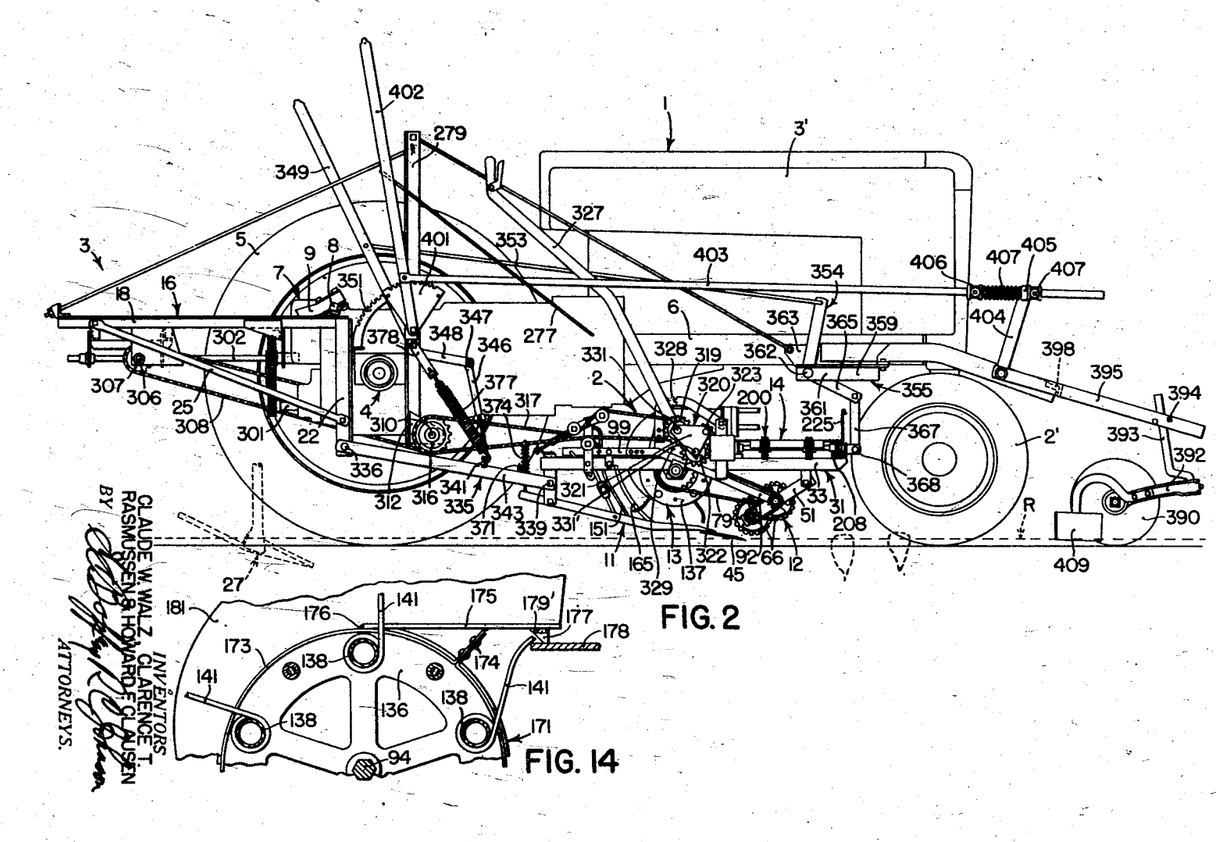
Figure 2 is a side view of the implement shown in Figure 1.
Figure 14 is a fragmentary sectional view taken generally along the line 14—14 of Figure 4.

The tractor 1 is of more or less conventional construction, being a farm tractor of the three-wheel or tricycle type having centrally disposed front wheel means 2', a narrow elongated frame or body 3', a rear axle structure 4 and a pair of laterally spaced rear traction wheels 5. The frame for the forward portion of the tractor is indicated in Figure 2 by the reference numeral 6. The tractor 1 is equipped with a power lift 7 having a rockshaft 8 and a lift arm 9.

The topping unit 2 comprises, in general, a topping knife 11, a beet engaging finder or gauge 12, and top pick-up means 13, the latter delivering the cut tops to a transverse shiftable conveyor, indicated in its entirety by the reference numeral 14 and which, as best shown in Figure 2, is carried by the topping unit 2.

Referring first to the rear unit 3, the details of which are shown in the Walz, Rasmussen and Griff application mentioned above, the rear unit 3 is carried on or includes a frame 16 which is made up of a pair of generally longitudinally extending angles 17 and 18 connected together by suitable cross bars 19 and 20 and connected at their forward ends to a pair of vertical bars 22 and 23 which are rigidly bolted or otherwise secured to the usual attaching pads 24 formed on the rear axle 4 of the tractor. The vertical and horizontal frame bars are reenforced by diagonal braces 26, and the lower ends of the vertical bars 22 and 23 extend downwardly below the rear axle 4, as shown in Figure 2. A beet lifting unit 27 is carried by the frame 16 for vertical movement and is operatively connected to be raised and lowered by the power lift arm 9, as explained in detail in the co-pending Walz, Rasmussen and Griff application.

The topping unit 2 comprises a supporting frame means in the form of a sub-frame 31 which is made up of a pair of generally longitudinally extending bars 32 and 33 connected at their forward ends by a transverse bar 34. The rear ends of the longitudinal bars 32 and 33 are bent laterally inwardly, as at 35 (Figure 4), the rear portions being welded or otherwise secured to a cross bar 36 which comprises a U-shaped member having downturned legs 37 and 38. The rear ends of the bars 32 and 33 are bent at right angles so as to embrace the rear edges of the downturned legs 37 and 38, as indicated at 39. If desired, the rear ends of the bars 32 and 33 may be bolted, as at 41, to the U-shaped cross bar 36.

The knife 11, which comprises the top severing means, includes a forwardly concave or curved cutting blade 45 secured at its ends to the forward ends of a pair of knife arms 46 and 47. The rear ends of the knife arms 46 and 47 are apertured to receive pivot bolts 48 and the portions of the knife arms 46 and 47 rearwardly of the pivot bolts 48 are connected together by a cross piece 49 which may be welded or otherwise secured thereto. The cross piece 49 receives knife-positioning means to which reference will be made below.

Figures 4, 11, 12:
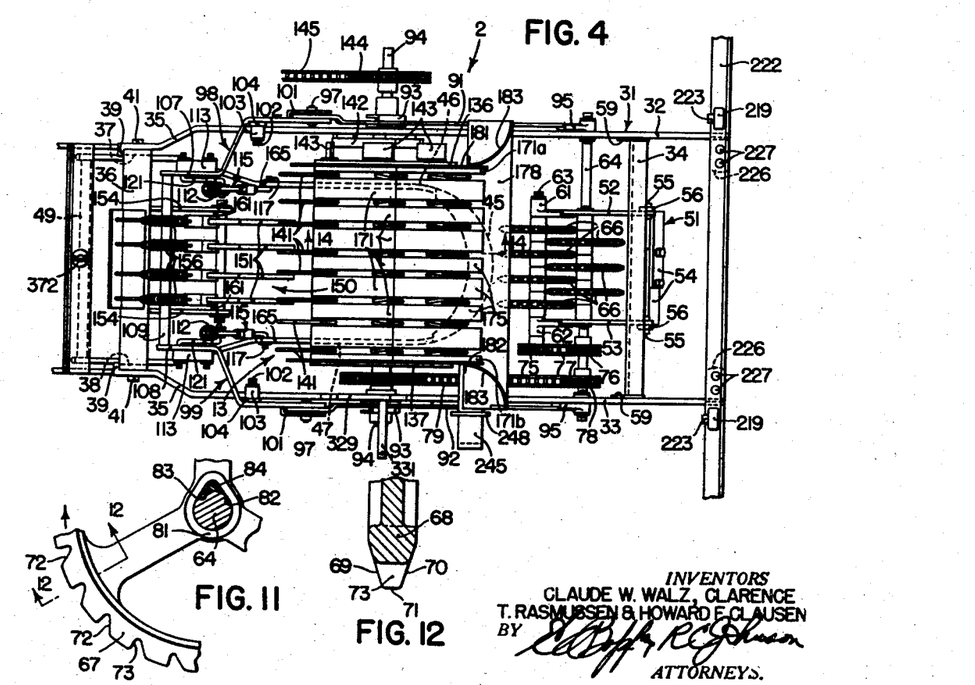
Figure 4 is a plan view of the topping unit shown in Figure 3.
Figure 11 is an enlarged fragmentary view of one of the beet gauging or finder wheels.
Figure 12 is a section taken along the line 12—12 of Figure 11.

The beet-engaging or finder unit 12 includes a generally U-shaped member 51 that is made up of a pair of downwardly and rearwardly extending bars 52 and 53 and forward interconnecting bars 54. The side bars 52 and 53 are apertured to receive pivot bolts 55 that are carried at the lower ends of a pair of suspension links 56. The upper ends of these suspension links 56 are pivoted to clips or the like carried by the cross bar 34. Thus, not only may the finder wheel frame 51 pivot generally vertically about the axis defined by the pivot bolts 55, but also the same may shift in a generally longitudinal direction by virtue of the swinging of the suspension links 56. The cross bar 34 preferably is secured to the longitudinal frame bars 32 and 33 by bolts 58 which pass through attaching plates 59 that are secured to the ends of the cross bar 34, as best shown in Figure 4. The lower ends of the side bars 52 and 53 are fixed to shaft-receiving journal castings 61 and 62, the latter carrying a transverse shaft 63. Also, intermediate their ends, the side bars 52 and 53 are apertured to receive a second transverse shaft 64. A plurality of beet-engaging finder wheels are non-rotatably mounted in staggered relation on the shafts 63 and 64, as best shown in Figure 4, the finder wheels being indicated by the reference numeral 66.

The teeth 67 on each of the finder or gauge wheels 66 are of special form best shown in Figures 11 and 12. The base of each tooth 67 is formed by the rim 68 of the wheel, and the sides 69 and 70 are disposed in outwardly converging planes, whereby each tooth 67 is generally of wedge-shaped section. The tops of the teeth are substantially flat, as indicated at 71, and the advancing end of each tooth is beveled at an angle of approximately 45-degrees while the other end 73 of each tooth is disposed in substantially a radial plane.

Figure 3:
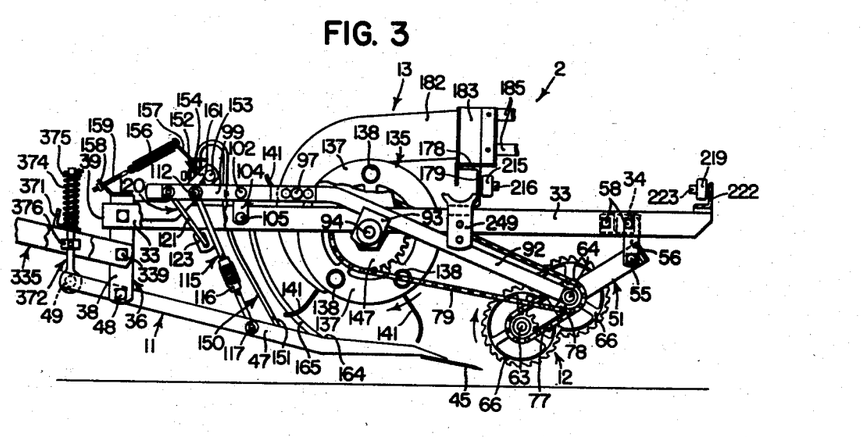
Figure 3 is an enlarged fragmentary side view of the principal parts of the topping unit.

The advantage of this particular tooth construction for the gauge or finder wheels is that when the wheels are driven, in the direction of the arrow shown in Figures 3 and 11, slightly in excess of the ground speed of the implement, the wheels pass downwardly through the leaves of each plant into contact with the crown but without having the leaves, streamers and the like catching on the wheels and without having the wheels cut downwardly into the beet crown. Having the advancing end of each tooth beveled at about 45-degrees prevents any tendency for leaves, streamers and the like from catching onto the wheels, and since the sides 69 and 70 of the teeth are tapered or angled, the wheels, even though they are rotated in excess of the ground speed, do not cut into the beet crowns any appreciable amount. The wheels 66, therefore, effectively "find" or gauge the tops of the beet crowns irrespective of leaves and the like growing upwardly from the crowns.

Sprockets 75 and 76 are fixed to the right ends of the shafts 63 and 64 and are connected to be rotated together by a sprocket chain 77. A third sprocket 78 is fixed to the forward shaft 64 at the outer end portion thereof, just inside the right-hand topping frame bar 33, and a chain 79 is trained around the sprocket 78 and serves to drive the finder wheels 66. The chain 79 is driven from the top pick-up unit 13, as will be described below. As best shown in Figure 11, the hub 81 of each of the finder wheels 66 is provided with a shaft-receiving opening 82 that includes an oblong extension 83. The associated shaft 64 has welded thereto a lug 84 which is received by the hub extension 83, whereby the finder wheel is fixed to rotate with the associated shaft 64. Each finder wheel 66 is formed in this manner and each of the shafts 63 and 64 is provided with a lug such as the one indicated at 84 in Figure 11. By this means the finder wheels are constrained to rotate with the shafts on which they are mounted.

The gauge or finder unit 12, which includes the driven wheels 66, is connected to adjust the vertical position of the knife 45 by linkage that affords a ratio of movement of the finder wheels to the movement of the knife of about 1.4 through 1.7 to 1. This linkage will now be described. A pair of levers 91 and 92 are disposed on the laterally outer sides of the topping unit frame bars 32 and 33, and each lever carries a bracket 93 which is apertured so as to be mounted on a shaft 94 that forms a part of the pick-up unit 13, the shaft 94 being supported by suitable bearings on the frame bars 32 and 33 and extending laterally outwardly therefrom at its opposite ends. The front end of each of the levers 91 and 92 is fixed to a pivot casting 95 which receives the outer ends of the finder wheel shaft 64, as best shown in Figure 4. The rear end of each of the levers 91 and 92 is provided with a plurality, preferably three, apertures, and a pivot bolt 97 is adapted to be inserted in any one of said apertures. Associated with the pair of levers 91 and 92 is a second pair of levers 98 and 99. The forward end of each of these latter levers carries a hammer strap 101, and the latter, together with the forward end of the associated lever, is provided with a plurality, preferably three, apertures in which the associated pivot bolt 97 is adapted to be inserted. A stud 102 is carried by each of the levers 98 and 99 and is received in a bushing 103 that is fixed to the upper end of a swinging link 104, the lower end of which is pivoted, as at 105, to the associated topping unit frame bar. By this means each of the two rear levers 98 and 99 is mounted not only for pivotal movement but also for generally fore and aft movement as accommodated by the swinging of the links 104. The rear portions of the two levers 98 and 99 are bent laterally inwardly and then rearwardly, as indicated at 107 and 108, respectively, these portions being rigidly connected together by a cross bar 109, whereby the two levers 98 and 99 act as one member.

The rear ends of the two levers 98 and 99 are connected, respectively, to the knife arms 46 and 47 well to the rear thereof and appreciably behind the pick-up unit 13. The link connection between the levers 98 and 99 and the knife unit 11 may take two forms, one of which is shown in Figures 3 and 4 and will now be described. A swivel eye 112 is rockably carried by the rear end of each of the levers 98 and 99, each rear end of the levers being reenforced by a block 113 welded or otherwise secured thereto and apertured to receive the eyebolt 112. A rod member 115, the effective length of which may be adjusted by a turnbuckle 116, has its lower end section turned laterally, as at 117, and pivoted in an opening formed in the associated knife arm. The upper end of each of the rod members 115 is slidably disposed through the eye of the associated member 112, thus providing a one-way or lost motion connection between the parts 98 and 99 and the rods 115. The upper end of each rod member 115 carries a cotter or other means, such as a collar, for limiting the downward movement of the rod members 115 relative to the associated levers 98 and 99, but the knife unit 11 is permitted to have upward swinging movement, irrespective of the position of the levers 98 and 99, by virtue of the fact that the upper ends of the rod members 115 may slide upwardly through the eyes of the parts 112. This upward movement is, however, limited by stop means which is indicated in its entirety in Figure 3 by the reference numeral 120. Preferably, such stop means comprises a link 121 pivoted to the rear end of each of the levers 98 and 99, and the lower end of each link 121 is turned laterally and disposed in a slot formed in a lug 123 that is fixed to the upper section of the associated rod member 115. The length of the slot in the two lugs 123 determines the permissive upward movement of the knife member 11 relative to the two levers 98 and 99.

Figure 13:
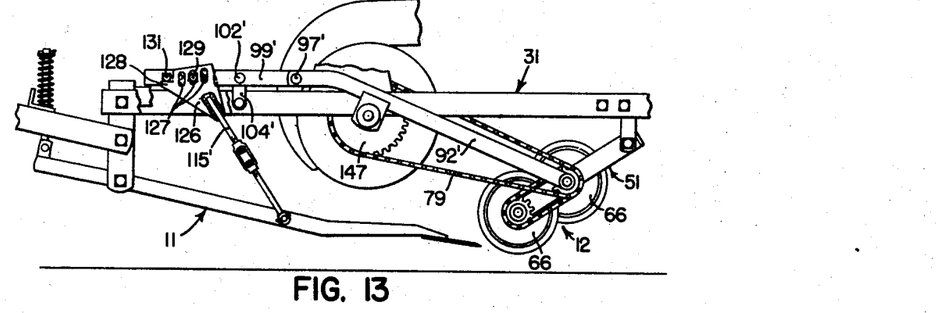
Figure 13 is a view similar to Figure 3, showing a modified connection between the beet topping knife and the finder linkage.

A modified form of linkage which may replace the rod members 115 and links 121 is shown in Figure 13 and will now be described. A pair of levers 92' is pivoted to the topping frame 31 and at their rear ends are pivoted, as at 102', to the forward end of a pair of swingably mounted levers 99'. In Figure 3, the pivots 97 are shown as adjustable but in Figure 13 the pivots 97' are not adjustable. The swingable mounting of the levers 99' is provided by swinging links 104'. A pair of rod members 115' are pivoted at their lower ends to the knife unit 11 and at its upper end each of the rod members 115' carries a generally triangular plate 126 which is provided with three slots 127 therein and an abutment section 128. A pivot bolt 129 may be disposed in any one of three openings formed in the rear portion of the lever 99', and a stud 131 is fixed to the rear portion of each lever 99' in a position to be engaged by the abutment section 128. The slots 127 and pivot bolt 129 form, in effect, a pin-and-slot type of one-way or lost motion connection between the knife unit 11 and the levers 99'.

In both of these forms of linkage, the action is as follows. When the finder traverses, for example, a large beet that projects a substantial amount above the ground, the finder frame 51 swings generally in a clockwise direction about its pivot supports 55 (Figure 3). This results in a counterclockwise rotation of the levers 91 and 92 and, due to the pivotal connection 97, in a clockwise rotation of the rear levers 98 and 99. This results in the upward movement of the rear ends of the latter levers, which upward movement exerts an upward pull through the associated rod members 115 against the knife unit 11, raising the cutting element 45 a desired proportional amount. Likewise, in Figure 13, the upward movement of the finder wheels results in a counterclockwise movement of the levers 92' and a clockwise movement of the levers 99'. This also raises the knife through the associated rod members 115'. In both forms, the amount that the knife is raised by any given upward movement of the finder unit may be predetermined by disposing the pivot 97 (Figure 3) in one or the other of the associated registering openings, or by disposing the pivot 129 (Figure 13) in one or the other of the slots 127 and the associated registering opening in the lever 99'. It will be observed that the finder wheels 66 are disposed a slight amount in advance of the associated knife 45, from which it will be seen that the wheels are in a position to roll off the beets while the knife 45 is still cutting through the beet. In order to permit the finder unit to drop down into a lower position immediately after it has passed over a beet but while the knife yet remains in an upper position in the beet, the lost motion connection that is provided by the sliding rod connection 112, 115 and slotted member 123 in Figure 3 and the slotted connection 127 in Figure 13 is utilized. In other words, by virtue of the linkage just referred to, the finder unit may drop down a certain amount while the knife element 45 is still held in a raised position. This downward movement of the finder is, however, limited so that there is no likelihood of their coming into contact with the knife element when the latter emerges from the beet whose top is being severed. To this end the length of the slots in the lugs 123 and the position of the abutment element 128 relative to the lug 131 are such that the amount of lost motion between the knife and finder is limited.

The top pick-up unit 13, that is rotatably supported by the shaft 94 referred to above, will now be described. The pick-up unit 13 includes a rotatable reel-like member 135 which comprises a pair of rotatable heads 136 and 137 that are fixed in any suitable manner to the shaft 94 in laterally spaced relation. A plurality of axially extending pipe members 138 have their ends received by and supported on the rotatable heads 136 and 137, each pipe member being rotatable therein. Secured to each pipe member is a plurality of top-engaging spring fingers 141 which, as best shown in Figure 3, normally extend generally radially outwardly with respect to the pick-up reel 135. A cam member 142 (Figure 4) is fixed to the topping frame bar 32 in generally eccentric relation with respect to the shaft 94, and an arm 143 is fixed to the left end of each of the finger-carrying pipes 138. A sprocket 144 is fixed to the left end of the shaft 94 and receives a driving sprocket chain 145 by which the reel member 135 is rotated. The arms 143 are controlled by the cam member 142 so that during the portion of the movement of the fingers 141 (Figure 3) past the knife element 45 and rearwardly and upwardly thereof the fingers are held in extended position. But when the fingers reach the forward limit of their generally forward movement, the arms 143 engage a portion of the cam member 142 that permits the fingers to be withdrawn or swing back generally radially inwardly. Opposite the end of the shaft 94 that carries the sprocket 144 is a second sprocket 147 over which the rear portion of the finder driving chain 79 is disposed, as best shown in Figure 3.

Normally, the reel unit 135 is driven in a clockwise direction, as shown by the arrow in Figure 3, and the fingers 141 engage the tops just after they are severed by the knife element 45. The fingers 141 are curved so as to engage the tops and sweep them rearwardly from the knife element 45 and then upwardly and generally forwardly over the top of the reel 135. This action is aided by a pivoted back rack 150 which consists of a plurality of generally downwardly extending rods 151 that are secured by clamping means 152 to a shaft 153 that is mounted for rocking movement in a pair of brackets 154 that are fixed to the U-shaped cross bar 36 and held in position by a plurality of springs 156 which at their forward ends are connected to brackets 157 rigidly secured to the rods 151 and at their rear ends to a plate bracket 158 by adjusting bolt means 159. These back rack rods 151 tend to keep the tops engaged with the pick-up fingers 141 during their rearward and upward travel, the springs 156 permitting the rods 151 to yield rearwardly to accommodate an unusual amount of tops. As best shown in Figure 3, the upper end portions of the back rack rods 151 are U-shaped, the rear ends extending downwardly below the clamps 152. A transverse stop rod 161 is carried by the brackets 154 in a position to be engaged by the ends of the rods 151 and thereby limit their forward swinging under the influence of the springs 156.

It will be noted from Figure 4 that the outermost spring fingers 141 are disposed laterally outwardly of the associated knife arms 46 and 47, and it will also be noted that the next inner fingers 141 are disposed closely adjacent the associated knife arms. In order to prevent leaves, streamers and other trash from collecting on the rod members 115 (Figure 3), we provide trash guide arms 165, one for each knife arm. These trash guide arms 165 are curved generally in an arc about the axis of the shaft 94 and at their lower and forward ends are fixed, as by welding or the like, to the associated knife arms, as indicated at 164. The upper and rear ends of the trash guide arms 165 are unattached and spaced an appreciable amount from any adjacent structure. These trash guide arms 165 cooperate with the rotating fingers 141 whereby any leaves, streamers and the like that might otherwise become entangled on the knife arms are, guided by the arms 165, swept upward and rearward by the rotation of the fingers, away from the linkage 115 and other parts until, when they pass off the upper ends of the guide arms 165, they are free to move with the tops generally forwardly onto the conveyor unit 14 that is supported by the topping frame 31. The transverse top conveyor will be described below.

Figure 6:
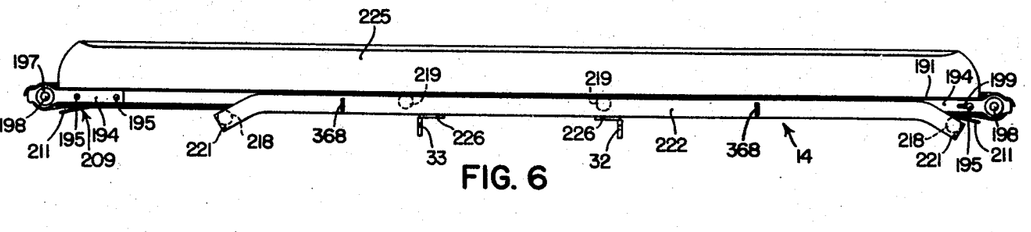
Figure 6 is a view taken generally along the line 6—6 of Figure 5.
Figure 15:
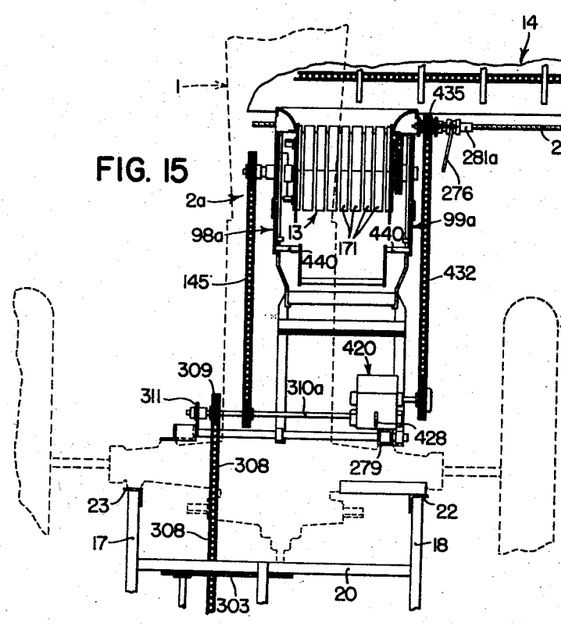
Figure 15 is a plan view similar to Figure 1, showing a modified form of reversing gear incorporated in the driving connections between the tractor and the top conveyor.
Figure 16:
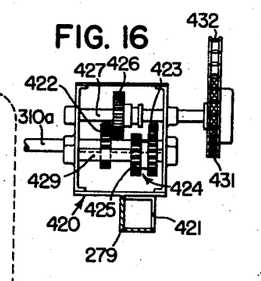
Figure 16 is an enlarged fragmentary view showing the reversing gear box employed in the form of the invention shown in Figure 15.

As the top pick-up fingers 141 sweep the leaves, tops and the like upwardly and rearwardly and then forwardly, the fingers, by the action of the cam 142 and arms 143, are withdrawn from the mass of tops and the like partly by cooperation with stripping means that forms a part of the pick-up unit 13. Referring now to Figure 14, such stripping means just referred to comprises a plurality of generally circular bands 171 that are disposed about and in general supported by the pipes 138 and placed generally between the pick-up fingers 141. Each of the stripper bands 171 is made up of a strap 173 of circular formation with its ends 174 secured together in any suitable manner. An extension strap 175 is secured, as by welding, to the ends 174 and to the circular part of the stripper, as at 176. A small lug 177 is fixed, as by welding 179', to the forward end of each extension strap 175, and the rear edge of each lug 177 is formed at an angle so as to eliminate or minimize any tendency for leaves and the like to catch on the lugs 177. The lugs 177 rest on an angle 178 which, in turn, is carred by right and left hand brackets 179 that are respectively fixed to the topping unit frame bars 32 and 33. The outermost of the stripping elements, indicated in Figure 4 by the reference numerals 171a and 171b, are provided with sides or shields 181 and 182, the forward ends of these side shields lying closely adjacent curved forwardly diverging plates 183 that are carried by or fixed to the angle member 178. Secured to and extending generally forwardly and laterally outwardly with respect to the pick-up unit are pairs of guide straps 185 which are fastened by attaching angles 186 (Figure 1) to the curved plates 183. These guide straps 185 are generally resilient and are disposed to extend forwardly and laterally outwardly over the top conveyor 14 for the purpose of urging the tops toward the forward side of the conveyor when the conveying element of the latter is driven in one direction or the other. The top conveyor 14 includes a generally transversely extending platform indicated in its entirety by the reference numeral 190. The platform 190 includes a pair of laterally spaced channels 191 and 192 maintained in spaced apart relation by a number of connecting pipe members 193 which are connected at their opposite ends to the webs of the channels 191 and 192, the flanges of which are directed laterally outwardly, as best shown in Figure 15. A bracket 194 (Figure 6) is secured, as by bolts 195, to each end of each of the channels 191 and 192, and the laterally outer end of each bracket 194 is apertured to receive bearing means 197 in which end conveyor shafts 198 are mounted for rotation. The brackets 194 at the left end of the conveyor, right end as viewed in Figure 6, are slotted, as indicated at 199, whereby the brackets are adjustable laterally outwardly for the purpose of tightening a movable conveyor element of the conveyor unit. Said element, which is indicated in its entirety by the reference numeral 200, includes a pair of sprocket chains 201 and transverse slats 202, each of the latter having downturned ends 203. The pair of chains 201 are adapted to operate over sprockets 204 that are fixed to the shafts 198. Disposed underneath the upper run or flight of the endless elevator element 200 is a sheet 206 that is fastened along its edges to the upper flange of the channels 191 and 192. For the purpose of keeping the lower flight or run of the endless conveyor element 200 from sagging, we secure plates 208 and 209 along the lower flanges of the channels 191 and 192 to serve as a support for the ends 203 of the slats 202, as best shown in Figures 2 and 6. Each of the plates 208 and 209 is provided with end sections 211 that are turned downwardly to serve as guides for guiding the slats 202 as they move around the sprockets 204 during the operation of the conveyor.

The conveyor just described is supported on the topping frame 31 by means of a pair of rollers 215 each of which is journaled on a stud 216 (Figure 3) that is carried by and projects forwardly from the two supporting brackets 179 that carry the angle 178. The flanges of the rear channel 192 are adapted to receive and ride along the rollers 215. At the forward side of the conveyor the front channel 191 is carried by four rollers, consisting of an outer pair 218 and an inner pair 219. The laterally outer pair of rollers 218 are carried by the downturned end sections 221 of a transverse angle 222 which, as best shown in Figure 4, forms a rigid part of the topping frame 31. The intermediate portion of the angle 222 carries the central conveyor-supporting rollers 219, the latter being mounted on studs 223 fixed to the vertical flange of the angle 222 in any suitable manner.

A side sheet 225 is fixed along its lower edge to the front angle 191 of the laterally shiftable conveyor platform 190. Preferably, the front angle 222 is secured to the frame bars 32 and 33 of the topping frame by means of brackets 226 that are welded or otherwise secured to the frame bars 32 and 33 and bolts 227 (Figure 4) which fasten the horizontal flange of the angle 222 to the brackets 226.

According to the principles of the present invention, the conveyor element 200 is adapted to be driven in either one direction or the other, and also, the conveyor as a whole is adapted to be shifted in either one direction or the other. This is for the purpose of disposing the tops at either one side or the other of the tractor and at different distances from the tractor whereby there may be deposited in one windrow the tops cut from any of several plant rows. A conveyor of this type therefore cooperates with the laterally swinging beet conveyor that is mounted on the rear frame 16 and is shiftable to different lateral positions at either one side or the other of the tractor, or directly rearwardly thereof, as shown and claimed in the above-mentioned Walz, Rasmussen and Griff application. The mechanism for driving and controlling the conveyor will now be described.

Figure 5:
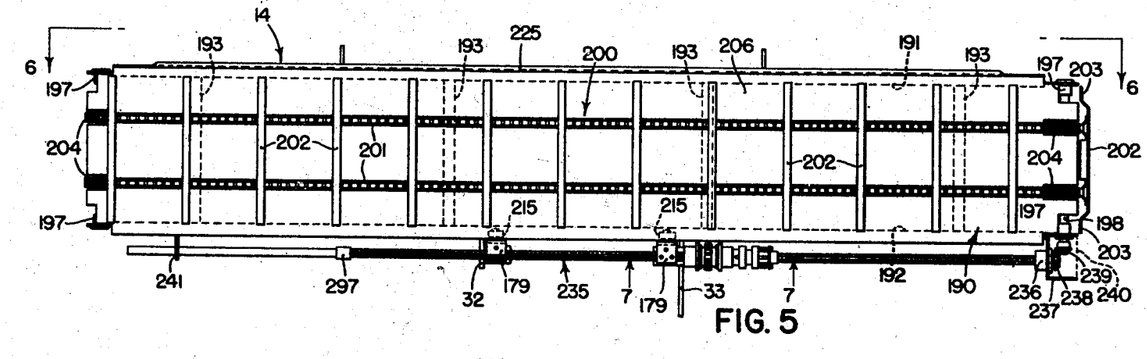
Figure 5 is an enlarged plan view of the laterally shiftable top conveyor that is carried by the topping unit.

Referring first to Figure 5, a transverse worm shaft 235 is disposed longitudinally of the conveyor platform 190 and at one end is supported for rotation in bearing means 236 carried by a bracket 237 that is fixed to the right end of the rear platform channel 192. A gear 238 is mounted on the right end of the rotatable shaft 235 and meshes with a companion gear 239 fixed to the right conveyor drive shaft 198, whereby rotation of the shaft 235 rotates the shaft 198 and actuates the conveyor element 200, advancing the upper flight or run thereof either to the right or left along the upper sheet or table 206 of the platform, according to the direction of rotation imparted to the conveyor shaft 235. The other end of this shaft is supported in a bearing bracket 241 connected with the left end of the rear platform channel 192. The shaft 235 is threaded for the majority of its length and preferably is provided with a triple thread in order to secure a rapid traverse when shifting the conveyor as a whole either to the right or left relative to the tractor. Gears 238, 239 are enclosed in a casing 240.

Figures 7, 9, 10:
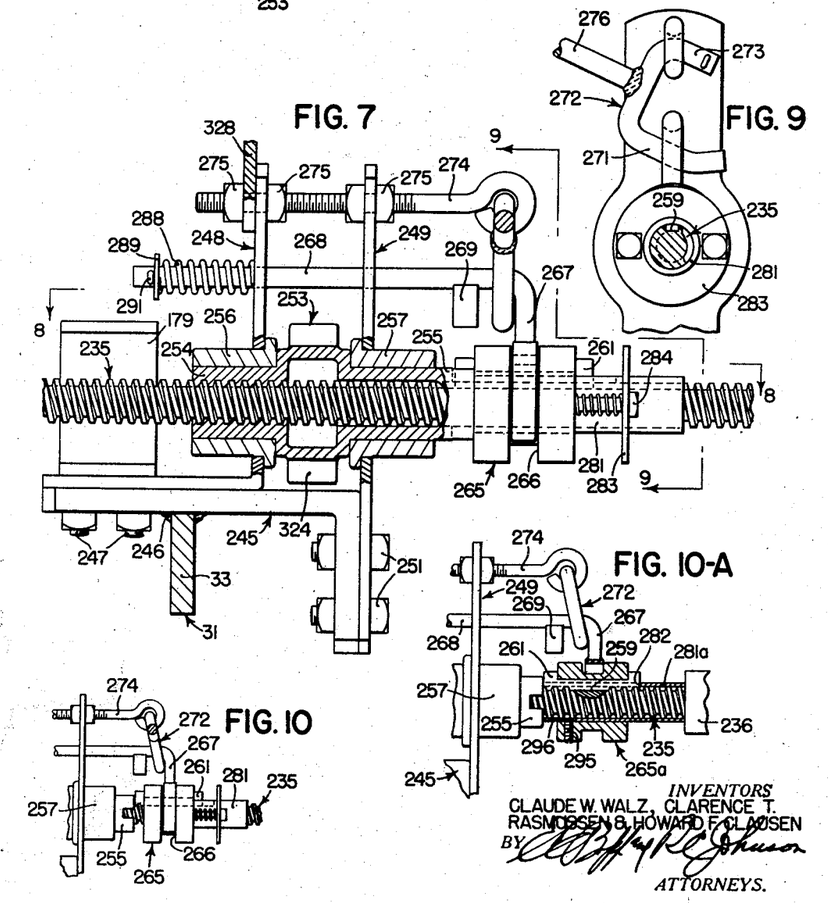
Figure 7 is an enlarged detail view, being a generally vertical transverse section taken along a line 7—7 of Figure 5, showing the mechanism for controllably driving and shifting the conveyor.
Figure 9 is a view taken along the line 9—9 of Figure 7.
Figure 10 is a view similar to Figure 7 but showing the parts in the position they occupy while the conveyor is being shifted laterally.

Optionally controllable means is provided for either rotating the shaft 235 so as to drive the conveyor element 200 or, acting through the shaft 235, to shift the conveyor toward one side or the other, as desired. Turning now to Figure 7 which shows the driving and controlling mechanism in detail, the reference numeral 245 indicates a bracket that is welded, as at 246, to the right hand topping frame bar 33. The bracket 245 extends laterally inwardly over the top of the bar 33 and provides means whereby the right hand bracket 179 may be secured, as by bolts 247, to the topping frame. The bolts 247 are also employed to secure in place an upstanding bracket 248. A companion bracket 249 is fastened, as by bolts 251, to the outer or right hand portion of the bracket 245. The two upstanding brackets 248 and 249 are thus mounted in spaced apart relation and receive therebetween a combination gear and nut member 253 having extended hub portions 254 and 255, one of which is threaded to receive the threaded shaft 235. The nut member 253 is supported by bearings 256 and 257 that are carried by the upstanding brackets 248 and 249 and rotatably receive the hub sections 254 and 255. By virtue of this construction, the nut member 253 is rotatable but is held against axial displacement by its support through the brackets 248 and 249 on the topping frame 31.

Figure 8:
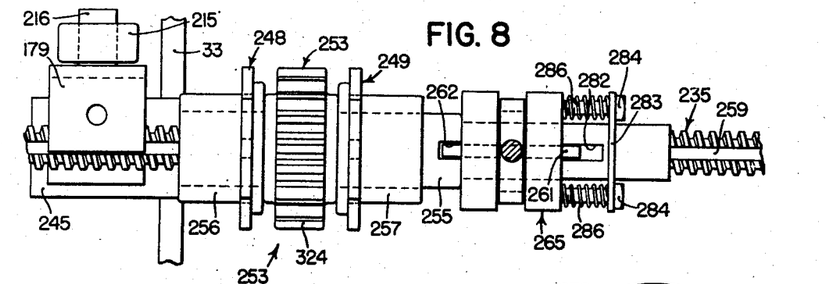
Figure 8 is a view taken generally along the line 8—8 of Figure 7.

As best shown in Figure 8, the shaft 235 is provided throughout its threaded section with a longitudinal slot 259 in which a clutch key 261 is normally disposed. The key 261 is also adapted to enter a notch 262 formed in the right end of the nut member hub 255 so that, when the key 261 is engaged in the notch 262, the nut member 253 is locked fixedly to the conveyor shaft 235 and, when driven, serves to rotate the latter, and when the key 261 is withdrawn from the notch 262, the nut member 253 is capable of rotation relative to the shaft 235 and, if the latter is itself restrained against rotation, rotation of the nut member 253 will then serve to shift the conveyor in one direction or the other, according to the direction in which the nut member 253 is driven.

For shifting the clutch key 261 into and out of engagement with the nut member 253, we provide a shiftable clutch collar 265 having a groove 266 in which a forked member 267 is adapted to be disposed. The forked member 267 includes a rod extension 268 that is shiftable generally laterally through openings formed in the brackets 248 and 249. A lug 269 is secured to the rod section 268 adjacent the downwardly extending forked section 267 so as to provide a space therebetween to receive the lower end 271 (Figure 9) of a control arm 272, the upper portion 273 of which is swingably supported in an eyebolt 274 which is carried for adjustment laterally by the brackets 248 and 249 and secured in different positions of adjustment by nuts 275. The control arm 272 includes a shank section 276 that extends upwardly and rearwardly and, as best shown in Figure 2, terminates in a handle 277 disposed adjacent the operator's station on the tractor 1. Preferably, the clutch controlling member 276 is mounted adjacent the upper end of an angle 279 that forms a part of the bracing structure connecting the rear frame 16 with the tractor. By rocking the arm 272 in one direction or the other, the key 261 is shifted into or withdrawn from the notch 262 on the hub 255 of the nut member 253.

The shiftable collar 265 is mounted on a stop sleeve 281 which is carried loosely by the shaft 235 to the right of the hub 255. The sleeve 281 is provided with an elongated notch 282 in which the key 261 is disposed and is longitudinally shiftable, as best shown in Figure 8. A flange 283 is also carried by the sleeve 281 and is apertured to receive a pair of bolts 284 that are threaded into the clutch collar 265. A pair of springs 286 are disposed about the two bolts 284. For normally urging the key 261 into engagement with the nut member 253, we provide a spring 288 about the left end of the horizontal section 268 of the yoke 267. One end of the spring 288 acts against the bracket 248 while the other end acts against a washer 289 held in place by a cotter 291.

A modified form of conveyor clutch is shown in Figure 10A which eliminates the flange 283 and the bolts 284 and springs 286. Referring now to this figure, wherein parts identical with those described above have been indicated by the same reference numerals, the stop sleeve 281a is somewhat shorter than the stop sleeve 281, but the slot 282 therein is of substantially the same length. The clutch collar 265a is the same as the clutch collar 265 described above except that an aperture is formed therein to receive a pin 295 the inner end of which fits in a slot 296 formed in the inner end of the sleeve 281a. The length of the slot 296 is such as to permit the collar 265a to be shifted relative to the sleeve 281a a distance sufficient to fully disengage the key 261, even when the sleeve 281a is confined between the end of the hub section 255 and the bearing 236, which occurs when the conveyor has been moved the maximum amount to the left. When the conveyor has been moved the maximum amount to the right, a stop collar 297 (Figure 5) comes up into engagement with the end of the nut member 254 or the hub 256. In other words, assume that the operator rocks the control arm 272 in a counterclockwise direction (Figure 7 or Figure 10A). This will withdraw the key 261 and permit the nut member to rotate without rotating the shaft 235. The resistance to movement offered by the sprocket chains 201 and other parts is greater than the resistance to bodily shifting of the conveyor as a whole, and therefore, when the key 261 is withdrawn from the nut member 253 and the latter rotated, the shaft 235 remains stationary but the conveyor as a whole is shifted in one direction or the other. Assuming that the operator holds the key 261 in disengaged position for an excessive length of time and the conveyor is shifted to the right, eventually the stop collar 297 (Figure 5) will come up against the end of the hub 254. This locks the nut member against further rotation in that direction along the shaft 235 and, in effect, causes the nut member 253 now to rotate the shaft 235, driving the conveyor element. Thus, no harm can be done to the machine even though the operator holds the clutch disengaged for an excessive length of time. As will be described below, the nut member 253 can be driven in either direction, as desired, and assuming that the nut member is rotated in the other direction, with the clutch key 261 disengaged from the notch 262 and held in that position for an excessive length of time, eventually the conveyor will be shifted to the left such a distance that the bearing 236 comes up against the right end of the sleeve 281 (or 281a). This position is illustrated in Figure 10A. The function of the sleeve 281 or 281a is to thus stop the further traverse of the conveyor, since any rotation of the nut member 253 after the bearing 236 comes up against the end of the sleeve serves merely to drive the conveyor element. Yet the nut member 253 can be rotated in the other direction and the clutch key 261 released so as to enter the notch 262. Without the sleeve 281 or its equivalent, the excessive left hand movement of the conveyor would bring the bearing 236 up against the end of the key 261 and jam the same against the end of the nut member. This then would prevent the nut member from being rotated in either direction relative to the shaft 235 and would therefore prevent the parts from being disengaged so as to permit the conveyor to be backed off in the other direction.

The mechanism for driving not only the conveyor just described but also the top pick-up unit and the finder wheels is best shown in Figures 1 and 2. Referring now to these figures, the tractor 1 is provided with a power take-off shaft 301 which carries a sprocket that drives a longitudinal shaft 302 through a sprocket chain 303 and a sprocket fixed to the forward end of the shaft 302. A pair of bevel gears 305 serve to drive a cross shaft 306 from the longitudinal shaft 302, and a sprocket 307 is mounted on the cross shaft 306 and is connected by a chain 308 with a sprocket 309 fixed to a transverse shaft 310 carried by brackets 311 and 312 that are fixed to the rear axle of the tractor at the forward side thereof. Preferably, the right hand bracket 312, as best shown in Figure 2, is fixed to the lower end of the bracing angle 279. Adjacent the left end of the cross shaft 310 a sprocket 315 is fixed (Figure 1) and serves to drive the sprocket chain 145 that extends forwardly and, as described above in connection with Figure 4, is trained around the sprocket 144 that is fixed to the left end of the pick-up drive shaft 94. Adjacent its right end, the cross shaft 310 receives a sprocket 316 that drives a sprocket chain 317 which extends forwardly and at its forward end is trained over a sprocket 318 (Figure 1). Fixed to the sprocket 318 is the first gear 319 of a motion reversing unit 320. This motion reversing unit includes a swinging carriage 321 in which a second gear 322 is journaled together with a third gear 323 that meshes with the gear 322. The gear 322 is mounted on a stud 331' on the swinging carriage 321. The gears 322 and 323 are so arranged on the carriage 321 that by swinging the latter, either the gear 323 or the gear 322 may be swung into engagement with the gear section 324 that is formed on the nut member 253 (Figure 7). The casing 321 is adapted to be moved from a neutral position, in which neither of the gears 322 and 323 engage the teeth 324 on the member 253, into either of two optional positions by means of a hand lever 327 and carries the usual detent mechanism cooperating with a sector 328 that is fixed in any suitable manner to the topping frame 31, such as by being secured by the inner nut 275 to the bracket 248 at its forward end and at its rear end to a bracket 329 (Figures 2 and 4) that is welded to and forms a part of the outside frame bar 33. A stud 331 is welded to the bracket 329 and serves as a support for both the gear 319 and sprocket 318 and the swinging carrier 321.

Referring again to Figure 1, a draft connection in the form of a draft frame 335 is pivoted at its rear end, as at 336, to a transverse member 337 carried at the lower ends of the vertical angles 22 and 23 (Figure 1). The draft frame 335 is reenforced by cross braces 338 and is pivoted at its forward end, as at 339, to the downwardly extending sections 37 and 38 of the rear cross brace 36 (Figure 3). A transverse angle 341 is secured at its ends to the side members 342 and 343 of the draft frame 335 and receives the lower end of an adjustable rod connection 346. The upper end of the latter is pivoted, as at 347, to the forwardly extending arm 348 that is secured to or forms a part of a lifting lever 349 that is pivotally mounted on the angle 22 and carries the usual detent mechanism cooperating with a sector 351 fixed at one end to the frame 16. A longitudinally extending link 353 is connected at its rear end to the hand lever 349 and extends forwardly and is connected at its forward end to an arm 354 rockable in a front frame 355 that is carried by the tractor. Preferably, the front frame 355 includes a pair of longitudinal bars 356 and 357 that are adapted to be fixed to the sides of the tractor, as best shown in Figure 1, and a laterally outwardly disposed longitudinal bar 358, the three bars 356, 357 and 358 being secured to an angle 359 which at its right hand end is bent rearwardly, as indicated at 361. A rockshaft 362 is journaled for rocking movement in the rearwardly extended end 361 of the angle 359 and is supported from the tractor by a pair of brackets 363 secured in any suitable manner to the sides of the tractor, as best shown in Figure 2. The arm 354 is secured to the rockshaft 362. A pair of lifting arms 365 and 366 (Figure 1) are fixed adjacent the ends of the rockshaft 362 and are connected by downwardly extending links 367 with apertured brackets 368 fixed to the front angle 222 of the topping unit frame 31.

Thus, by rocking the hand lever 349 in a rearward direction, the topping unit is raised through the upward swinging of the rear arm 348 (Figure 2) and the front lifting arms 365, the rear end of the topping unit being raised by virtue of the upward swinging of the draft frame 343.

The swinging movement of the draft frame 343 relative to the topping unit when raising and lowering the latter, is made use of for automatically raising and lowering the knife 11. Referring to Figure 2, a transverse angle 371 is connected to the side bars 342 and 343 of the draft frame and generally intermediate its ends is apertured to receive an eyebolt 372 which at its lower end is pivotally connected to the cross member 49. A compression spring 374 is disposed about the upper end of the eyebolt 372 above the angle 371 and at its upper end bears against a washer 375 held in place on the bolt by a collar or the like. A stop collar 376 is carried by the lower portion of the eyebolt 372 and is disposed a short distance below the angle 371 when the parts are in operating position. When, however, the topping unit is raised, the upward swinging of the draft frame 335 not only raises the rear end of the topping unit but, by swinging downwardly relative to the topping unit about the pivot 339, acts through the stop member 376 to exert a downward force against the rear end of the knife unit 11, swinging the front end of the latter upwardly. This insures that the front end of the knife unit will be raised to provide ample clearance, but the lost motion connection incorporated in the linkage between the finder unit and the knife limits the upward movement of the knife so that it cannot be swung upwardly into contact with the finder wheels. In operation, the effect of the spring 374 is to urge the knife unit 11 downwardly at all times, except when the topping unit is raised. The weight of the topping unit and the conveyor carried thereby is at least partially offset by a pair of counterbalancing springs. One of the springs, indicated by the reference numeral 377 in Figure 2, is connected between the draft frame 335 and a link 378 that is connected to the angle 22. At the left side of the tractor (Figure 1) a second counterbalancing spring 380 is connected at its rear end to the tractor and at its forward end to an arm 381 fixed to the left end of the rockshaft 362.

In order to cut away from the beets to be harvested, any streamers and large leaves so as to prevent overloading the top handling mechanism, we provide a pair of coulters 390, each coulter being mounted for rotation on a coulter arm 392 carried by a shank 393. The shanks of the coulters are fixed by clamping means 394 to a vertically swingable U-shaped coulter-supporting frame 395. This frame is secured at its rear end to a transverse rockshaft 396 that is carried by the front ends of the front frame bars 356, 357 and 358. The latter two bars are extended forwardly and cooperate with a cross bar 398 to serve as a stop limiting the downward movement of the coulters.

The coulters are raised automatically when the topping unit is raised by virtue of a connection with the lifting lever 349. Referring now to Figure 2, a sector 401 is carried by the hand lever 349 and pivotally receives a coulter-adjusting hand lever 402. The latter lever is connected by a push rod 403 with an arm 404 fixed to the rockshaft 396. The upper end of the arm carries a swivel eye 405 through which the rod 403 is slidable. A pair of set screw collars 406 and 407 are fixed to the forward end of the push rod 403, and a spring 407 is confined between the rear set screw collar 406 and the swivel eye 405. The coulter adjusting lever 402 carries the usual detent mechanism cooperating with the sector 401. By pushing forwardly on the coulter adjusting lever 402, a greater amount of spring pressure can be applied to holding the coulters in their working position, yet when the lifting lever 349 is swung rearwardly, the coulters are raised into their transport position at the same time that the topping unit is raised into its transport position. Each of the coulter arms 392 carries a jointer 409 for pushing the streamers, leaves and trash away from the path of the finder wheels and the topping knife.

The operation of the form of the invention described above is substantially as follows.

Referring first to Figure 2 wherein the parts are shown in their operating position, the row of beets being dug being indicated in dotted lines and shown by the reference numeral R. As the machine travels down the row of beets the rotatable finder wheels, being rotated at approximately 25 percent over ground speed, readily climb up on to and pass over the crowns of the beets, the peripheries of the finder wheels cutting down through the tops to "find" the crowns but not cutting into the beet itself to any appreciable extent. Small beets are of course contacted only by the lower wheels 66 but the larger beets are first engaged by the upper wheels, but since both are driven, the finder readily accommodates and guages both large and small beets alike. As the finder climbs up onto a beet, the levers 92 are rocked in a counterclockwise direction, which results in raising the knife element 45 to the proper position to cut off the right amount of crown, the lost motion connection between the rear levers 98 and 99 permitting the finder wheels to drop down immediately they pass over the beet even though the knife is still engaged in the beet. This prevents breakage of the beets at the crowns and thus eliminates topping loss. The amount of movement of the finder wheels with respect to the resulting movement of the knife is a ratio of between 1.4 and 1.7 to 1, although this may vary as desired. The clockwise rotating pick-up reel 13, with its top-engaging fingers 141, sweeps the severed tops rearwardly off the knife 45 and, guided by the back rack 151 and the trash guide arms 165, swings the tops, leaves and the like rearwardly and upwardly, and then forwardly over the stripper elements 171, the forward movement of the fingers 141 just prior to their withdrawal by the action of the cam 142 serving to push the mass of tops and leaves forwardly. This action is facilitated by the fact that the forward ends 175 of the strippers are held a short distance above the platform angle 178, yet leaves, trash and the like do not tend to catch on the lugs 177 that hold up the ends 175, by virtue of the inclined or angled edges (Figure 14) of the lugs 177. The tops are thus forced forwardly onto the conveyor 14, where they are picked up by the laterally moving conveyor element 200 and delivered to one side or the other of the tractor. As lateral movement is initially imparted to the tops, whether in one direction or the other relative to the tractor, the resilient guide straps 185 (Figure 1) serve to shift the tops generally in a forward direction over against the shield 225, or at least in that direction, so that the tops do not pile up along the rear side of the conveyor 14.

The movable conveyor element 200 of the conveyor 14 may be driven in one direction or the other, as desired, by swinging the hand lever 327 into either of its end positions. Further, when the end of the row is reached and the outfit turned around to pass down the next row, the conveyor 14 is shifted relative to the tractor so as to deposit the tops in the same windrow to which they were delivered on the previous trip. The conveyor 14 may be shifted by swinging the clutch lever 277 so as to move the clutch key 261 (Figure 7) out of engagement with the nut member 253, and then driving the latter in one direction or the other, which results in shifting the conveyor 14 as a whole. The shifting movement may be terminated instantly by releasing the cluch lever and permitting the spring 288 to reengage the clutch key 261 with the nut member, whereupon operation of the conveyor element 200 will be resumed without further attention on the part of the operator.

When the outfit reaches the end of the row, as just stated, the operator swings the hand lever 349 rearwardly so as to raise the topping unit into transport position. This is done just prior to the operation of the tractor power lift 7 because it is, of course, necessary to leave the lifter unit 27 in the lowered position until all of the topped beets have been lifted and deposited onto the beet conveyor or elevator. During the lifting of the topping unit, the action of the upward swinging of the draft frame 343 relative to the topping frame acts to impart an additional lifting motion to the knife 45, thus insuring that the latter will not be inadvertently caught on anything in or lying on the ground when turning the outfit at the end of the row. The lifting of the topping unit also serves to raise the coulters 390 into their transport position.

Mention was made above of the fact that whenever the outfit has turned at the end of the field so as to be in a position to pass down and harvest the beets from the next row, the position of the conveyor 14 is readjusted in order to deposit the tops in the windrow in which the beets from the previous row were also deposited. It should be mentioned at this point that, in addition, the operator swings the beet conveyor into its new position in order, for the same purpose, to deliver the beets from the next row into the same windrow into which they were delivered by the beet conveyor on the previous trip. Also, when the power lift of the tractor is actuated to raise the beet lifting unit 27, the beet conveyor (not shown) is also raised to facilitate turning at the end of the field. Depositing the tops from several beet rows into one windrow, which may readily be accomplished by shifting the top conveyor into different positions as describe above, is one feature of the present invention that contributes materially to the proper handing of the tops so that they do not spoil, nor is there any soil or dirt mixed in with the tops. Also, by windrowing them the tops may be placed so that it is not necessary to run over them with a truck, the tractor or the beet loader during the subsequent operation of loading the beets from the beet windrow into a truck or other conveyance. Moreover, the windrowing of both the beets and the tops produces piles of beets and tops, respectively, that are large enough to make loading economical.

In Figure 15 we have shown a modified arrangement for driving the conveyor 14. In the form of invention shown in this figure, parts that are identical with those described above and shown in other figures are represented by the same reference numerals. Referring now to this figure, a reversing gear box or transmission 420 is carried adjacent the lower end of the angle 279, being rigidly secured thereto by means that includes a filler angle 421. A shaft 310a journaled at its left end in the bracket 311 carries the sprocket 309 and therefore receives the drive from the power take-off shaft through the driving chain 308. The right end of the shaft 310a is supported for rotation in the transmission 420 and carries two gears 422 and 423. The latter serves to drive a double idler gear 424 having a gear section 425 thereon that is adapted to receive a sliding gear 426 mounted on a driven shaft 427 also journaled in the gear box 420. Any suitable means, such as a handle 428 (Figure 15) may be provided for shifting the sliding gear 426. The idler gear 424 is supported on a shaft 429, and the three shafts 310a, 427, and 429 are so arranged that the sliding gear 426 may be disposed in mesh with either the gear 422 or the gear 425, or the sliding gear 426 may be disposed in a position out of engagement with either of them. The right end of the shaft 427 extends outwardly of the gear box and carries a sprocket 431 that receives a driving chain 432.

In this form of the invention the same conveyor 14 is used, including the rotatable worm shaft 235. However, the gear-nut member 253 (see Figure 7) is replaced by a nut member 435 which is similar to the member 253 except that, instead of having gear teeth 324 the member 435 is provided with sprocket teeth receiving the chain 432. It will be observed that the latter element provides a simple direct connection between the gear box 420 and the nut member 435, and that in this form of the invention it is not necessary to mount any reversing gear unit, such as the unit 320 shown in Figure 1, on the topping unit. Instead, the reversing gear is mounted rigidly on the tractor. Figure 15 also shows a slightly different construction for the knife controlling levers, differing from the levers 98 and 99 (Figure 4) in that each of the levers 98a and 99a is made up of two bars connected together by a pipe member 440.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A beet harvester comprising the combination with a tractor of a beet lifter unit including a frame fixed to the rear axle of the tractor, a topping unit disposed forwardly of said rear axle and shiftable generally vertically relative to the tractor, a draft connection extending from said frame to said topping unit, said connection accommodating said vertical movement of the topping unit, a generally transverse conveyor unit supported for generally vertical movement relative to the tractor by said topping unit, and means on the tractor for raising and lowering the latter and said conveyor unit.

2. In a tractor mounted beet harvester, the combination of a beet lifter unit adapted to be fixed to the rear axle of the tractor and including a frame having downwardly extending portions extending to points below said rear axle, a topping unit disposed forwardly of said rear axle and shiftable generally vertically relative to the tractor, a draft frame means pivotally connected at its rear end with the downwardly extending portions of said lifter frame and at its forward end with said topping unit, and means for raising the latter including a lever adapted to be mounted on the tractor and link-connected with the front portion of said topping unit and a second lever adapted to be mounted on the tractor adjacent said rear axle and link connected with said draft frame means.

3. A beet harvester as defined in claim 2, further characterized by a colter-supporting frame adapted to be fixed to the tractor adjacent the front portion thereof and extending generally forwardly therefrom, means including a pair of laterally spaced colters pivoted to said colter-supporting frame and disposed forwardly of the front wheels of the tractor, and means for raising and lowering said colters connected with one of said levers, whereby both the topping unit and said colters may be raised and lowered together.

4. In a tractor mounted beet harvester, a topping unit, means including a pair of levers adapted to be pivotally mounted on said tractor for raising and lowering said topping unit relative thereto, a colter-supporting frame adapted to be connected with the forward portion of said tractor, a pair of colters disposed forwardly of the front wheels of the tractor and pivotally connected with said colter-supporting frame, and means connecting said colters with one of said levers, whereby said topping unit and said colters may be raised and lowered simultaneously.

5. In a beet harvester, a topping unit, supporting means therefor, means for mounting said topping unit on said supporting means for generally vertical movement relative thereto, said topping unit including a topping frame and a topping knife movably supported on said topping frame, means connected with said supporting means and said topping unit for raising and lowering said topping unit relative to said supporting means, and motion multiplying means connected with said topping knife and said raising and lowering means and operated when said topping unit is raised for shifting said topping knife generally upwardly relative to said topping unit.

6. In a tractor mounted beet harvester, a topping unit adapted to be connected with the tractor for generally vertical movement relative thereto, draft transmitting means for said topping unit adapted to be connected with the tractor and with said topping unit, the latter including a pivoted topping knife, means for raising and lowering said topping unit, and means connected between said draft transmitting means and said pivoted knife whereby the latter is raised relative to the topping unit whenever said topping unit is raised.

7. In a beet harvester, a topping unit comprising a knife member pivotally connected at its rear end with the rear portion of the frame of the topping unit, a beet engaging finder pivotally connected with said topping unit frame and means including a lost motion connection extending from said finder to said knife, whereby movement of the finder in an upward direction raises said knife, said lost motion connection accommodating downward movement of said finder while said knife is held in an upper position, as when passing through a beet.

8. A beet harvester as defined in claim 7, further characterized by stop means associated with said lost motion connection whereby the downward movement of said finder relative to said knife is limited so as to prevent one from coming into contact with the other.

9. A beet harvester as defined in claim 7, further characterized by means for raising said topping unit, and means actuated concomitantly therewith for raising both said finder and said knife relative to the topping unit.

10. In a beet harvester, a topping unit comprising supporting frame means, a finder frame swingably connected at its forward end with the forward portion of said supporting frame means, a knife unit pivotally connected with the rear portion of said supporting frame means, a first lever pivotally connected with said supporting frame means at an intermediate point and with said finder frame at its forward portion, a second lever pivotally connected with the rear portion of said supporting frame means and pivoted to the rear end of said first lever, and a connection between the rear end of said second lever and said knife unit.

11. The invention set forth in claim 10, further characterized by driven finder means carried by said finder frame, a pick-up unit carried by said supporting frame means and including a rotatable member mounted for rotation generally about the axis passing through the pivot between said first lever and said supporting frame means, said driven finder including a part rotatable about an axis passing through the pivot between the forward end of said first lever and said finder frame, and a driving connection extending from said rotatable member to the rotatable part of said driven finder means.

12. In a topping unit for a beet harvester or the like, a vertically swingable topping knife member, a finder unit mounted for generally vertical movement, a pivoted lever actuated by said finder unit, a one-way connection between said lever and said knife unit whereby movement of said finder unit in one direction acts through said connection for positioning said knife unit, said finder being movable in the other direction without moving said knife unit, and means for limiting the movement of said finder in said other direction relative to said knife unit.

13. The invention set forth in claim 12, further characterized by said one-way connection comprising a part pivoted to the knife unit and slidably connected with said lever, a slotted portion carried by said pivoted part, and a link pivoted to said lever and having an end movable in said slotted portion.

14. The invention set forth in claim 12, further characterized by said connection comprising a part pivoted to said knife unit and having a pin and slot connection with said lever, and a stop carried by said lever and adapted to engage a portion of said part for limiting the movement of said knife unit relative to said part.

15. In a topping unit for a beet harvester or the like, supporting frame means, a topping knife unit pivotally connected therewith, spring means for urging said knife unit downwardly relative to said supporting frame means, a crop-engaging finder, and means providing a one-way connection for connecting said finder with said knife unit, said finder acting through said lost motion unit for raising the knife unit against the action of said spring means, said lost motion connection providing for downward movement of the crop-engaging finder without entailing downward movement of the topping knife unit.

16. In a topping unit for a beet harvester or the like, supporting frame means, a topping knife unit movably connected therewith and adapted to be raised and lowered relative to said supporting frame means, spring means for urging said knife unit downwardly relative to said supporting frame means, a crop-engaging finder connected with said knife unit for raising the latter relative to said supporting frame means against the action of said spring means, means for raising said topping unit supporting frame means and said finder relative to the harvester, and means operatively connected with said last mentioned raising means and including motion multiplying means acting against said knife unit through said spring means and connected between the knife unit and said raising means for raising said knife unit relative to said topping unit supporting frame means when said topping unit is raised.

17. A topping unit for beet harvesters and the like, comprising supporting frame means, a pair of generally forwardly extending laterally spaced knife arms pivoted to said supporting frame, a knife element carried at the forward ends of said knife arms, a top pick-up unit supported by said frame means and comprising a plurality of top-engaging fingers movable rearwardly from said knife element and then upwardly away from said knife arms, and an upwardly curved guide arm secured at its lower end to each of said knife arms, said guide arms being disposed generally alongside the path of movement of said top-engaging fingers, the upper ends of said guide arms being free, said top-engaging fingers being adapted to sweep leaves and the like from said knife arms onto said guide arms and off the latter at their upper ends.

18. A topping unit as defined in claim 17, further characterized by means for raising and lowering said knife unit comprising links connected with said knife arms generally rearwardly of said guide arms whereby the latter and said top-engaging fingers serve to keep leaves and the like from catching on said links.

19. In a beet harvester, topping means including a generally transverse knife and a pair of generally forwardly extending laterally spaced knife arms to the forwardly extending portions of which said knife is fixed, and a top pick-up unit comprising a member having top-engaging fingers, certain of which are disposed on opposite sides of said knife arms rearwardly of said knife.

20. In a beet harvester, topping means including a generally transverse knife and a pair of generally forwardly extending laterally spaced knife arms to the forwardly extending portions of which said knife is fixed, a top pick-up unit including generally rearwardly movable fingers, means for supporting said unit generally above said knife arms so as to position said fingers adjacent to and on both sides of said knife arms, and means for driving said unit so as to move said fingers alongside said knife arms to clear the latter of leaves and the like.

21. A beet harvester adapted to be mounted on a tractor of the tricycle type, comprising a topping unit adapted to be mounted on the tractor adjacent the front end and at one side of the vertical plane of the longitudinal center line of the tractor and including a pair of laterally spaced coulters adapted to pass down a row of beets, topping means disposed rearwardly of the coulters, and top pick-up means rearwardly of said topping means adapted to receive tops therefrom, means for raising and lowering said coulters and topping and top pick-up means, beet lifting means carried at the rear of the tractor at said one side thereof and rearwardly of the rear axle thereof but in longitudinal alignment with said topping unit.

22. In a beet harvester, a topping unit comprising frame means, a topping knife including a generally forwardly extending supporting member connected with said frame means and a cutting element connected adjacent the forward end of said supporting member, a top pick-up unit carried by said frame means and including a rotatable part carrying top-engaging fingers, said rotatable part being disposed so that said fingers move rearwardly from said knife then upwardly and forwardly, stripper means for removing the tops from said fingers during their forward travel, and conveyor means disposed forwardly of said pick-up unit in a position to receive tops from said stripper means.

23. In a beet harvester, the combination of a tractor having a source of power, a topping device carried generally at the front of the tractor, top pick-up means carried by the tractor generally above said topping device in a position to receive tops from said topping device, a transverse conveyor carried by the tractor generally at the front thereof and forward of said pick-up means and adapted to receive tops from said top pick-up means, and means driven by said source of power for shifting said conveyor bodily transversely relative to the tractor.

24. An agricultural machine comprising supporting means, a conveyor unit carried thereby and adapted to be shifted bodily relative thereto, said conveyor unit including a driven conveying element, a source of power on said supporting means, means for shifting said conveyor unit, means including a part carried by said conveyor unit and connected with said conveying element for driving the latter, mechanism operatively connected between said source of power and both said shifting means and said part of said driving means for reacting against one of said means for driving the other means, optionally, and means for controlling said mechanism.

25. An agricultural machine comprising supporting means, a conveyor unit, means carried by the supporting means for supporting said conveyor unit for movement relative to the supporting means, a source of power on said supporting means, means connecting said source of power with said unit and including a screw-threaded shaft and means acting against said shaft for shifting the conveyor unit on said conveyor supporting means, means for rotating said shaft, and means whereby the rotation of said shaft operates said conveyor unit.

26. An agricultural machine comprising supporting means, a conveyor unit including a platform, an endless conveyor element movable over said platform, a worm shaft journaled for rotation on said platform and geared whereby rotation of said shaft serves to drive said conveyor element, a rotatable nut member journaled on said supporting means and receiving said worm shaft, means on said supporting means for holding said nut member against lateral displacement, means for rotating said nut member, and optionally operable means for locking said nut member to said worm shaft.

27. An agricultural machine as defined in claim 26, further characterized by said driving means including reversing mechanism whereby said nut member may be driven in either direction optionally.

28. Conveyor mechanism comprising means serving as a platform, an endless conveyor element movable over said platform, means supporting said platform for shifting movement relative thereto, a worm shaft journaled for rotation on said platform but held against endwise displacement relative thereto, said worm shaft having a longitudinal slot therein, a nut member journaled for rotation on said supporting means and held against axial displacement relative thereto, said nut member being in threaded engagement with said worm shaft, gearing between said worm shaft and said endless conveyor element whereby rotation of said worm shaft in said platform serves to drive said conveyor element, and controllable clutch means for optionally connecting said nut member with said shaft, whereby rotation of the nut member rotates said shaft, rotation of said nut member when said clutch member is disengaged serving to shift said shaft and the platform bodily relative to said supporting means.

29. The invention set forth in claim 28, further characterized by stop means associated with said worm shaft and adapted to lock the nut member to the shaft upon a predetermined extent of movement of the conveyor in either direction.

30. The invention set forth in claim 28, further characterized by biasing means acting against said clutch means for normally locking said nut member to said shaft, whereby driving said nut member serves to rotate said shaft and drive said conveyor element.

31. In conveying mechanism, a platform, a worm shaft journaled for rotation thereon, an endless conveyor element geared to be driven by the rotation of said worm shaft, a nut member receiving said shaft and in threaded engagement therewith, means restraining said nut member against axial movement, means for rotating said nut member relative to said shaft so as to shift said shaft and said platform, said shaft having a slot therein, clutch means including a key held in said slot and engageable with a notch in said nut member for locking the latter to said shaft, whereby rotation of said nut member rotates said shaft and drives said conveyor element, an abutment member at one end of said shaft, a stop sleeve surrounding said shaft at the clutch side of said nut member, said sleeve having an elongated slot receiving said key and accommodating movement of the latter into and out of engagement with said notch, said stop sleeve acting between said abutment and one end of said nut member for limiting the movement of the platform but accommodating movement of said key into either an engaged or disengaged position.

32. In a beet harvester having top handling means including mechanism for severing the tops and then shifting them generally longitudinally, and a transverse conveyor positioned to receive said tops and adapted to be driven in either direction, the combination therewith of a pair of divergent top guiding elements carried by the top pick-up mechanism and disposed over said conveyor at the side thereof toward which the tops are delivered, said guiding elements serving to shift the tops on the conveyor toward the other side thereof.

33. In a beet harvester, a generally horizontally arranged topping frame, a generally U-shaped topping knife movably carried thereby and including a forward cutting element, a rotatable top pick-up unit carried by said frame and including fingers movable rearwardly and upwardly from said cutting element, and a resiliently mounted back rack disposed adjacent the upward and rearward path of movement of said pick-up fingers.

34. In a beet harvester, a beet engaging gauge unit including a rotatable finder wheel having a plurality of peripheral teeth, said teeth being of generally wedge-like formation, the forward or advancing end of each tooth being beveled.

35. In a gauging device for beet harvesters and the like, a beet-engaging wheel having peripheral teeth whose sides are tapered, one end of each of said teeth being beveled, the tops of said teeth being flattened.

36. A beet harvester comprising an elongated mobile supporting frame, a topping and pick-up unit, means connecting the front and rear ends of said topping and pickup unit with said frame intermediate the front and rear ends of the latter for generally vertical adjustment relative to said supporting frame, a top conveyor unit carried by and movable generally vertically with said topping and pick-up unit relative to said mobile supporting frame and disposed in a position to receive the cut tops from said topping and pick-up unit and including a driven conveyor element, and mechanism for driving said conveyor optionally in either direction so as to deliver the tops optionally at one side or the other of said supporting means.

37. A beet harvester comprising supporting means, a topping and pick-up unit carried for generally vertical adjustment by said supporting means, a top conveyor unit carried by said topping and pick-up unit in a position to receive the cut tops therefrom and including a driven conveyor element, a platform over which said conveyor element is movable, a worm shaft journaled for rotation on said platform and geared whereby rotation of said shaft serves to drive said conveyor element, a rotatable nut member journaled on said topping and pick-up unit and receiving said worm shaft, means on said topping and pick-up unit for holding said nut member against lateral displacement, means for rotating said nut member in any vertical position of the topping and pick-up unit, and optionally operable means for locking said nut member to said worm shaft.

38. In a beet harvester, a topping and pick-up unit comprising a topping frame, a transverse top conveyor unit carried by said frame, a swingably mounted topping knife pivotally connected with said frame adjacent the rear end thereof, a pick-up drum disposed generally rearwardly of said knife and of said top conveyor unit, a finder unit pivotally connected with the front portion of said topping frame, said finder unit comprising rotatable elements, means interconnecting said finder unit with said knife whereby pivotal movement of said finder unit serves to shift said topping knife, and means driving said finder elements from said pick-up drum.

39. In a beet harvester, a topping and pick-up unit comprising a frame, a forwardly extending topping knife pivotally connected at its rear end with the rear portion of said frame, a rearwardly extending finder unit pivoted at its forward end to the forward end of said frame, said finder unit including driven elements, means connecting the finder unit with said topping knife whereby the position of the latter is controlled by said finder unit, a pick-up drum rotatably mounted on said frame adjacent the forward end of said topping knife, and means for driving said finder elements from said pick-up drum.

40. A topping unit for beet harvesters and the like, comprising supporting frame means, a pair of generally forwardly extending laterally spaced knife arms pivoted to said supporting frame, a knife element carried at the forward ends of said knife arms, and a top pick-up unit supported by said frame means and comprising a plurality of top-engaging fingers movable rearwardly from said knife element and then generally rearwardly along portions of said knife arms on both sides of the latter so as to sweep leaves and the like therefrom.

41. In a beet harvester, a support, a topping unit comprising a topping knife movably carried by said support, a top pick-up drum having top engaging fingers, means mounting said drum on said support above and generally rearwardly of said topping knife, a top conveyor carried by said support and disposed generally forwardly of said drum and receiving tops from the drum as the top engaging fingers sweep the tops upwardly then forwardly over to said conveyor, and means serving as a back rack mounted on said support and disposed rearwardly of said topping drum for keeping the tops engaged with said top engaging fingers as the latter move upwardly and rearwardly from said topping knife, and means for driving said drum and conveyor.

42. The invention set forth in claim 41, further characterized by said topping unit including a frame in which said topping drum is rotatably mounted, and said back rack means being pivoted in said frame and having lower portions swingable toward and away from said topping drum on the rear side thereof.

43. An agricultural machine comprising a support, a conveyor platform shiftably carried by said support, a driven conveying element movably carried by said shiftable platform, a rotatable part carried by the platform, means connecting said part with said conveying element for driving said conveying element therefrom, means for rotating said part for shifting said element, and means also acting against said part for shifting the latter and said conveyor platform.

44. Conveying mechanism comprising a support, a frame shiftable thereon, a movable conveyor carried by said shiftable frame, a rotatable shaft on said shiftable frame and connected to drive said conveyor, means for holding said shaft against longitudinal displacement relative to said shiftable frame means for rotating said shaft, optionally operable means for holding said shaft against rotation, and means acting against said shaft when the latter is held against rotation for shifting said frame relative to said support.

45. A topping unit for beet harvesters and the like, comprising supporting frame means, a pair of generally forwardly extending laterally spaced knife arms pivoted to said supporting frame, a knife element carried at the forward ends of said knife arms, and a top pick-up unit supported by said frame means and comprising a plurality of top-engaging fingers movable rearwardly from said knife element and then generally rearwardly along portions of said knife arms on the outer sides of the latter so as to sweep leaves and the like therefrom.

CLAUDE W. WALZ.
    CLARENCE T. RASMUSSEN.
    HOWARD F. CLAUSEN.

REFERENCES CITED

The following references are of record in the file of this patent:

UNITED STATES PATENTS

| Number | Name | Date |
|---|---|---|
| 922,084 | Carroll | May 18, 1909 |
| 2,308,392 | Roepke | Jan. 12, 1943 |
| 769,947 | Kramer | Sept. 13, 1904 |
| 1,086,522 | Gilman | Feb. 10, 1914 |
| 774,520 | Hewitt | Nov. 8, 1904 |
| 1,762,885 | Oppenheim | June 10, 1930 |
| 1,268,314 | Barton | June 4, 1918 |
| 833,456 | Goodfellow | Oct. 16, 1906 |
| 1,148,954 | Carr | Aug. 3, 1915 |
| 1,089,028 | Wittenburg | Mar. 3, 1914 |
| 1,830,740 | Leech | Nov. 3, 1931 |
| 931,789 | Newlon | Aug. 24, 1909 |
| 1,282,657 | Tussing | Oct. 22, 1918 |
| 1,140,202 | Smith | May 18, 1915 |
| 1,977,523 | Morkovski | Oct. 16, 1934 |
| 891,054 | Frankman | June 16, 1908 |
| 913,421 | McCormick | Feb. 23, 1909 |
| 919,342 | Gettelmann | Apr. 27, 1909 |
| 1,513,737 | Bohman | Nov. 4, 1924 |
| 2,166,626 | Devey | July 18, 1939 |

FOREIGN PATENTS

| Number | Country | Date |
|---|---|---|
| | France | Nov. 29, 1921 |
| | (Addition 24,127 to 498,024) | |
| 11,415 | Austria | Apr. 10, 1903 |
| 463,231 | France | Dec. 11, 1913 |
| 265,936 | Germany | Oct. 17, 1913 |